(12) United States Patent
Yeric

(10) Patent No.: US 9,875,332 B2
(45) Date of Patent: Jan. 23, 2018

(54) CONTACT RESISTANCE MITIGATION

(71) Applicant: ARM Limited, Cambridge (GB)

(72) Inventor: Gregory Munson Yeric, Austin, TX (US)

(73) Assignee: ARM Limited, Cambridge (GB)

( * ) Notice: Subject to any disclaimer, the term of this patent is extended or adjusted under 35 U.S.C. 154(b) by 77 days.

(21) Appl. No.: 14/851,644

(22) Filed: Sep. 11, 2015

(65) Prior Publication Data
US 2017/0076032 A1    Mar. 16, 2017

(51) Int. Cl.
*G06F 17/50*    (2006.01)

(52) U.S. Cl.
CPC ...... *G06F 17/5081* (2013.01); *G06F 17/5031* (2013.01); *G06F 17/5036* (2013.01); *G06F 2217/12* (2013.01); *G06F 2217/78* (2013.01); *G06F 2217/84* (2013.01)

(58) Field of Classification Search
CPC .................................................. G06F 17/5068
USPC ........................................................ 716/103
See application file for complete search history.

(56) References Cited

U.S. PATENT DOCUMENTS

| 6,209,123 B1 * | 3/2001 | Maziasz et al. ............ 716/123 |
| 2005/0026380 A1 | 2/2005 | Kammler et al. |
| 2007/0277137 A1 * | 11/2007 | Savithri .............. G06F 17/5068 716/115 |
| 2012/0217589 A1 | 8/2012 | Yin et al. |
| 2013/0015497 A1 | 1/2013 | Yin et al. |
| 2015/0014776 A1 | 1/2015 | Akarvardar et al. |

OTHER PUBLICATIONS

PCT International Search Report and Written Opinion; PCT/GB2016/052775; dated Dec. 12, 2016.
Shauly, et al.; CMOS Leakage and Power Reduction in Transistors and Circuits: Process and Layout Considerations; Applied Journal of Low Power Electron; vol. 2, No. 4; Jan. 27, 2012. DOI:10.3390/jlpea2010001.
Downey, et al.; Numerical Study of Reduced Contact Resistance via Nanoscale Topography at Metal/Semiconductor Interfaces; Semiconductor Science and Technology; vol. 25, No. 1; IOP Publishing Ltd; Dec. 18, 2009. DOI: 10.1088/0268-1242/25/1/015010.
Meijs, et al.; Space User's Manual; Department of Electrical Engineering, Delft University of Technology The Netherlands; Jun. 2001.

* cited by examiner

*Primary Examiner* — Suchin Parihar
(74) *Attorney, Agent, or Firm* — Pramudji Law Group PLLC; Ari Pramudji

(57) ABSTRACT

Various implementations described herein are directed to systems and methods for mitigating contact resistance. In one implementation, a method may include analyzing operating conditions for cells of an integrated circuit. The method may include selectively marking instances of the cells having timing degradation along a critical path of the integrated circuit. The method may include reducing contact resistance for the selectively marked instances of the cells having timing degradation.

19 Claims, 11 Drawing Sheets

CONTACT RESISTANCE MITIGATION

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Generally, electronic designers employ various techniques to design integrated circuits, such as physical chips and/or physical layers. In some situations, during design processes, designers may identify areas showing performance deficiencies that may need improvement. Sometimes, designers may attempt to use manual techniques of modifying standard cells to overcome performance deficiencies. However, conventional techniques may be inefficient and cumbersome due to being approached manually. Further, these conventional techniques may not be based on analytic data and so may be ineffective.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to contact resistance mitigation in physical design. For instance, contact resistance of various types of circuit components (e.g., cells, standard cells, transistors, etc.) may be modified and/or reduced to improve circuit performance in physical design, which may be implemented in fabrication facilities. In this instance, contact resistance mitigation in physical design may refer to selectively marking cells for fabrication with lower resistance, thus providing higher speed at possible cost of increased leakage. In some cases, cells with wider source/drain (S/D) contacts may provide higher speed with increased leakage, and thus one technique of reducing contact resistance may be to increase area of a contact. In this example, growing the contact laterally may reduce resistance and increase speed of cells. In other cases, cells with wider vias may provide higher speed with increased leakage, and thus, one other technique of reducing contact resistance may be to increase area of a via. In this example, growing via area may reduce resistance and increase speed of the cells. These techniques may improve performance of circuit components (e.g., cells, standard cells, transistors, etc.) when implemented in an integrated circuit.

Accordingly, various implementations of a system and methods for mitigating contact resistance in physical design will now be described in greater detail herein with reference to FIGS. 1-11.

Figure 1:
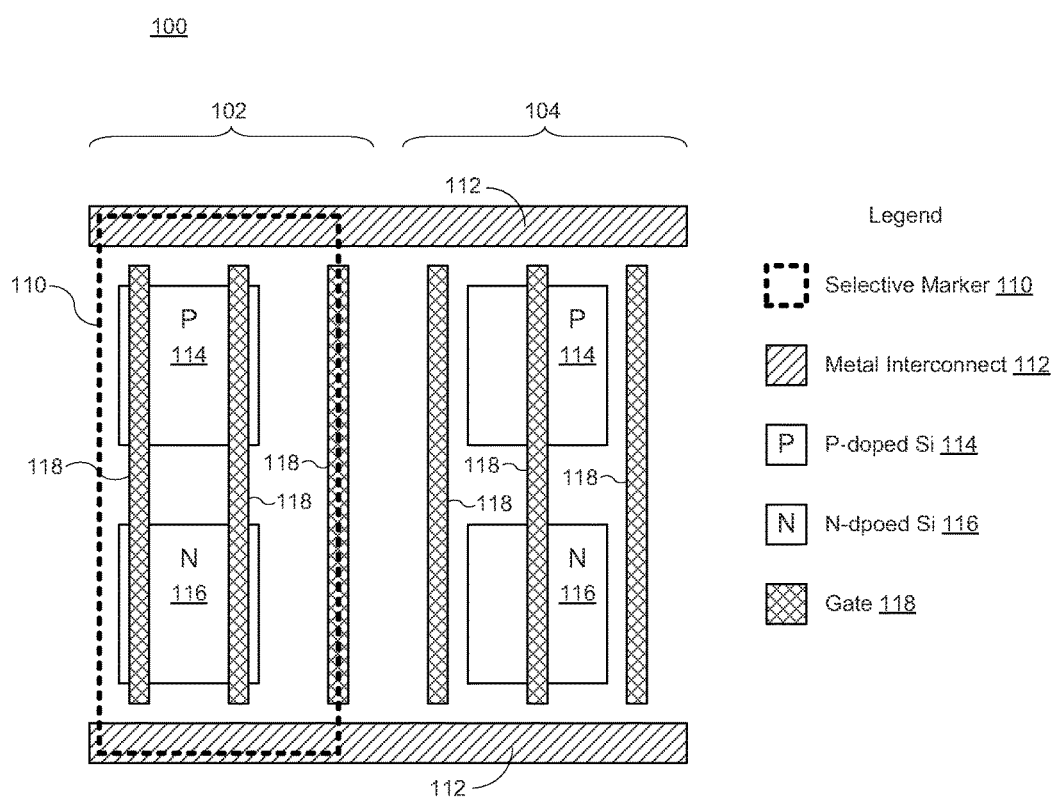
FIG. 1 illustrates a diagram of marking cells for mitigating contact resistance in physical design in accordance with various implementations described herein.

FIG. 1 illustrates a diagram of marking cells for mitigating contact resistance in physical design in accordance with various implementations described herein.

In reference to FIG. 1, a standard cell layout 100 of an integrated circuit is shown with a first instance of a cell 102 and a second instance of a cell 104. The standard layout 100 includes metal interconnects 112 that may be used to electrically connect the instances of cells 102, 104 to other circuitry of the integrated circuit. The standard layout 100 may include P-doped Si regions 114 and N-doped Si regions 116 for each of the first and second instances of cells 102, 104. The standard layout 100 may further include gate regions 118 proximate to each of the first and second instances of cells 102, 104. The first and second cells 102, 104 may be referred to as devices, transistors, or some other relevant circuit component that is active or non-active.

In physical design, operating conditions for the first and second instances of the cells 102, 104 of the integrated circuit may be analyzed. In some cases, one or more of the first and second instances of the cells 102, 104 may have timing degradation along one or more paths (including, e.g., critical paths) of the integrated circuit. In this instance, as shown in FIG. 1, e.g., the first instance of the cell 102 may have timing degradation and may be selectively marked with a selective marker 110. Accordingly, the contact resistance may be reduced for the selectively marked first instance of the cell 102 having timing degradation. Various techniques related to reducing contact resistance of selectively marked cells are described in greater detail herein below.

Foundries may reduce contact resistance through process improvements, such as improved silicides, Fermi level de-pinning, and Schottky barrier height reduction. These types of process improvements typically do not involve physical design. As such, there are options in physical design that may be added to these process improvements to reduce contact resistance. In some cases, these options may provide for creation of special low resistance physical cells, e.g., analogous to low VT cells (low voltage-threshold cells) that may be used for higher drive current. In a scenario involving multiple VT's, a low VT drawing layer may be added to a cell, and implants may be changed so that a higher drive current device is provided, with the possibility of higher leakage current. I.e., providing a higher drive current may result in an increase of leakage current. In FIG. 1, a device option marking layer or selective marker 110 may be used to designate a different VT implant, a different lithographic bias on gate CD, different S/D (source/drain) implant, and/or different silicide deposition. In some implementations, one or more of these process modifications may be used to reduce contact resistance at the expense of a degraded current-on/current-off ratio (Ion/Ioff ratio). Further, in selected devices, such as those in critical paths, this tradeoff may be beneficial, e.g., to improve timing of selectively marked instances of cells.

In some cases, another scenario may exist that is related to reducing contact resistance, and thus, there may be other device options provided to a circuit designer. In this case, the drawing layer may not be a blanket VT layer, but it may be a blanket low RC drawing layer that selectively marks specific transistors for special processing. For instance, special processing may refer to stronger implants and/or modified silicide depositions that may lower contact resistance for selectively marked instances of cells (transistors) at the expense of increased leakage for selected cells (transistors). In accordance with various implementations described herein, selectively marking cells or transistors for special processing may improve performance via special contact resistance processing that is directed to occur only on selected devices. These special processing techniques are described in greater detail herein below.

FIGS. 2-9 illustrate diagrams of methods for mitigating contact resistance in physical design in accordance with various implementations described herein.

Figure 2:
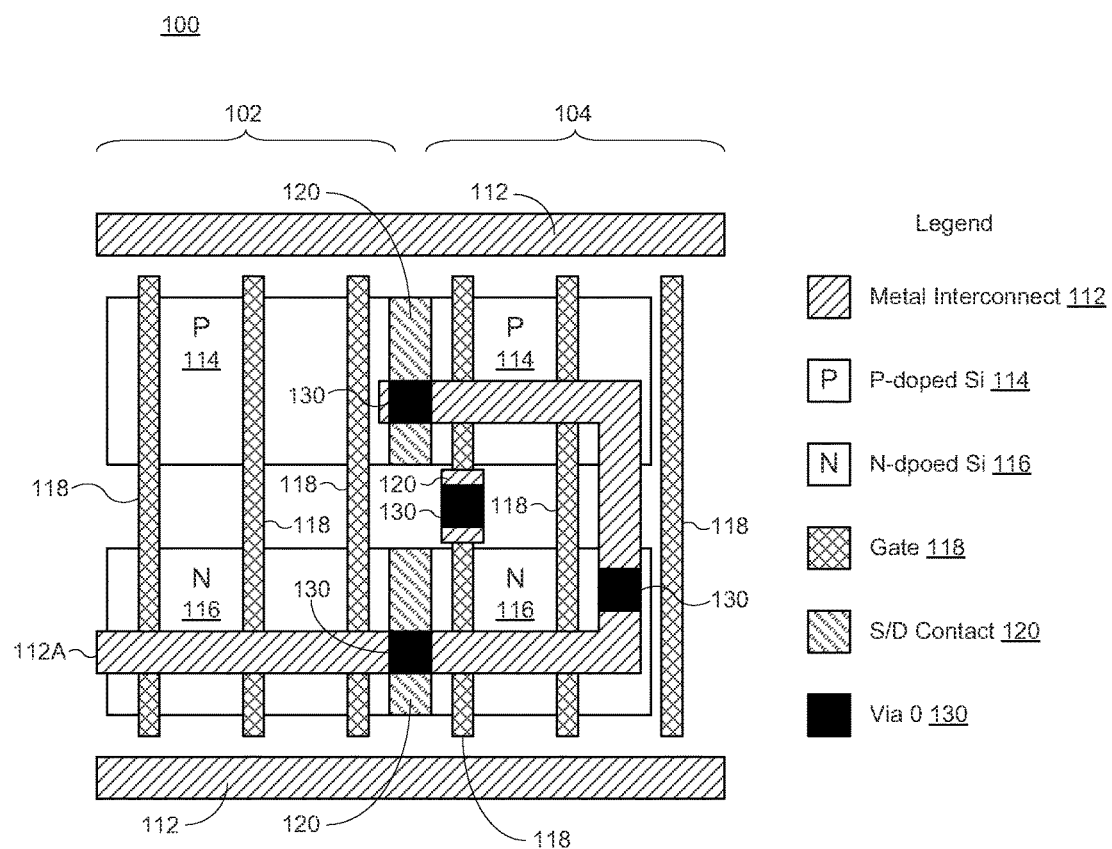
FIGS. 2-9 illustrate diagrams of methods for mitigating contact resistance in physical design in accordance with various implementations described herein.

In reference to FIG. 2, the standard cell layout 100 of an integrated circuit is provided with the first and second instances of cells 102, 104. As shown, the standard cell layout 100 may include the metal interconnects 112 and another metal interconnect 112A defining a path (e.g., a critical path) over the first and second instances of the cells 102, 104. One or more vias 130 (e.g., via 0) may be provided that connect the metal interconnect 112A to one or more S/D contacts 120 of the P-doped regions 114 and the N-doped regions 116 of the first and second instances of the cells 102, 104.

Figure 3:
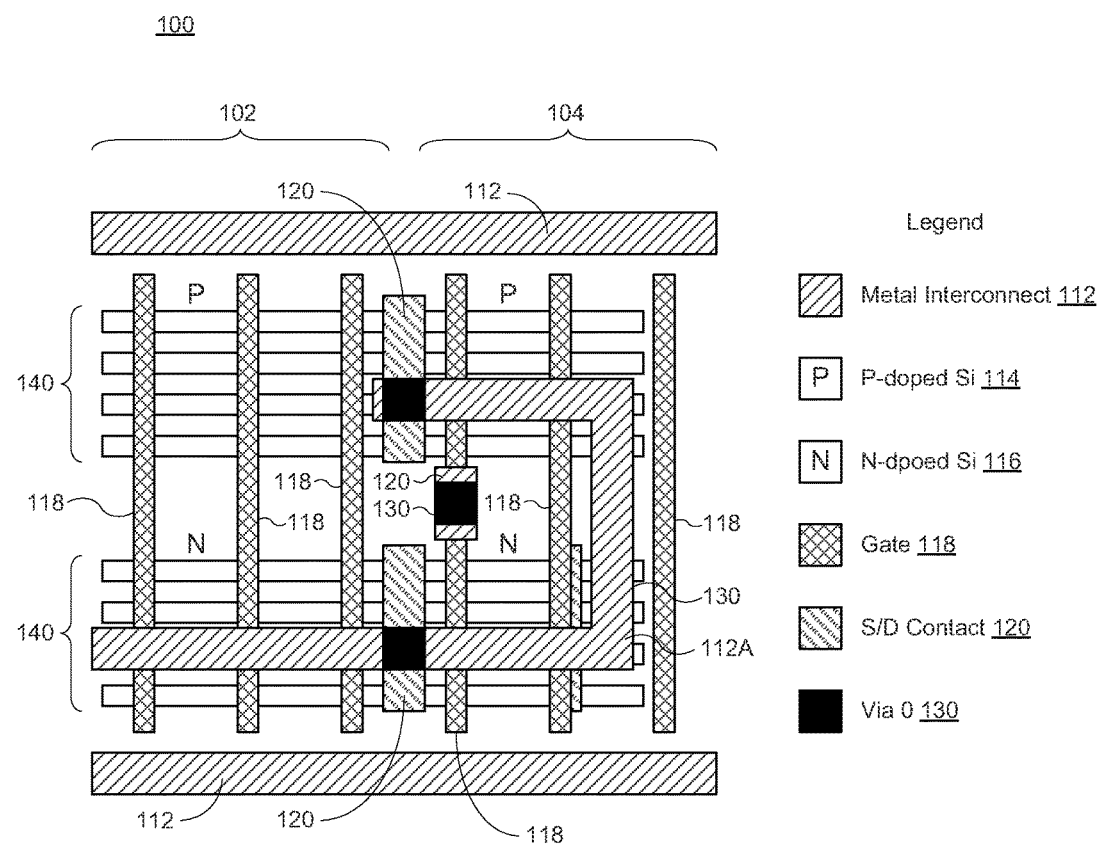

In some implementations, FIG. 2 may represent an incomplete portion of a standard cell. In some other implementations, the layout 100 may be representative of a modern layout (e.g., <=16/14 nm), where the contact to gate and contact to diffusion are separate drawing layers, and the contacts to diffusion may span full diffusion widths (i.e., P-doped Si regions 114 and N-doped Si regions 116). The N and P diffusion regions 114, 116 may be actual planar FET device widths (as shown in FIG. 2), or they may be comprised of one or more active fins 140 or nanowires (as shown in FIG. 3) that may be retained for the formation of transistors.

Alternatively, outside of either blanket and/or targeted process adjustments as described above, another technique to reduce contact resistance may include increasing an area of the contact, e.g., S/D contact 120. The area of the S/D contact 120 may be pre-determined by one or more of gate length, gate pitch, and a S/D-contact-to-gate spacing rule. In some implementations, the S/D-contact-to-gate spacing rule may be used to prevent or at least inhibit shorting of the S/D contact 120 to an adjacent gate, e.g., in presence of size or overlay variations.

Another technique that may be used to increase contact resistance may be to sacrifice (or remove) at least one gate so as to negate use of the S/D-contact-to-gate spacing rule on one side of the S/D contact 120. For example, one layout option for this scenario is described in reference to FIGS. 4-6.

Figure 4:
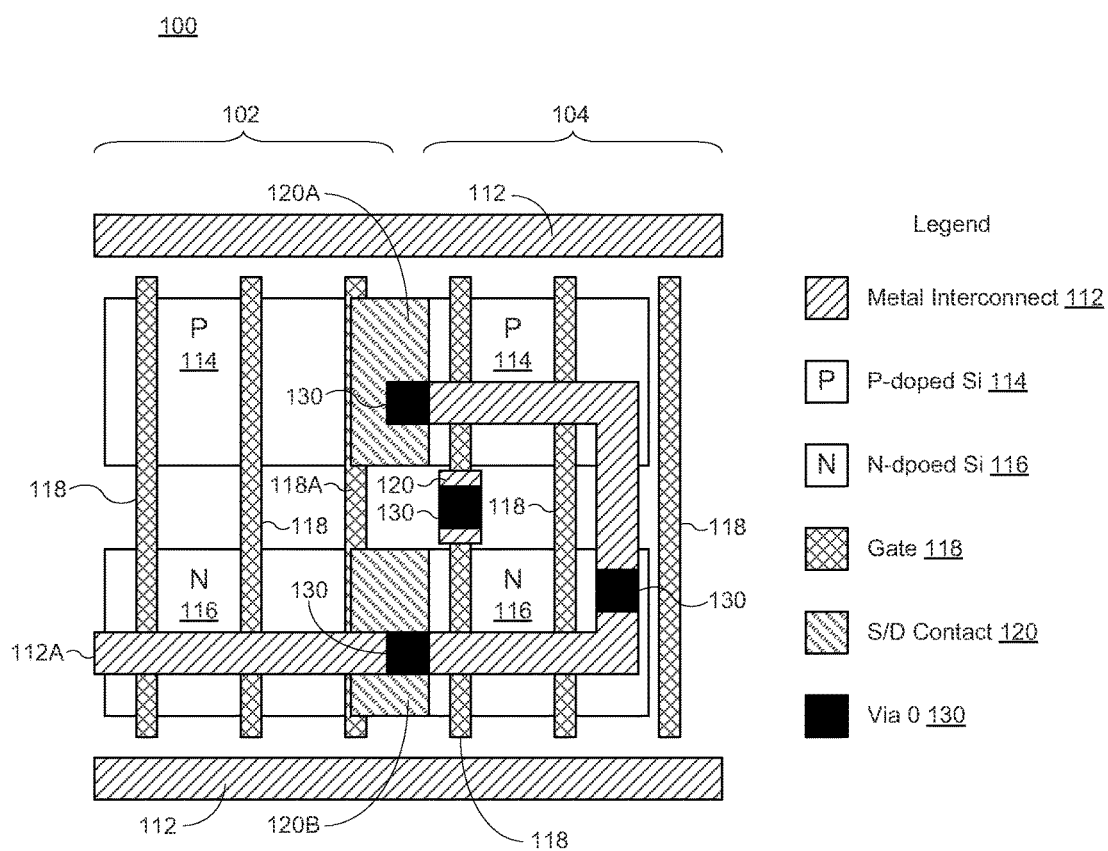
Figure 5:
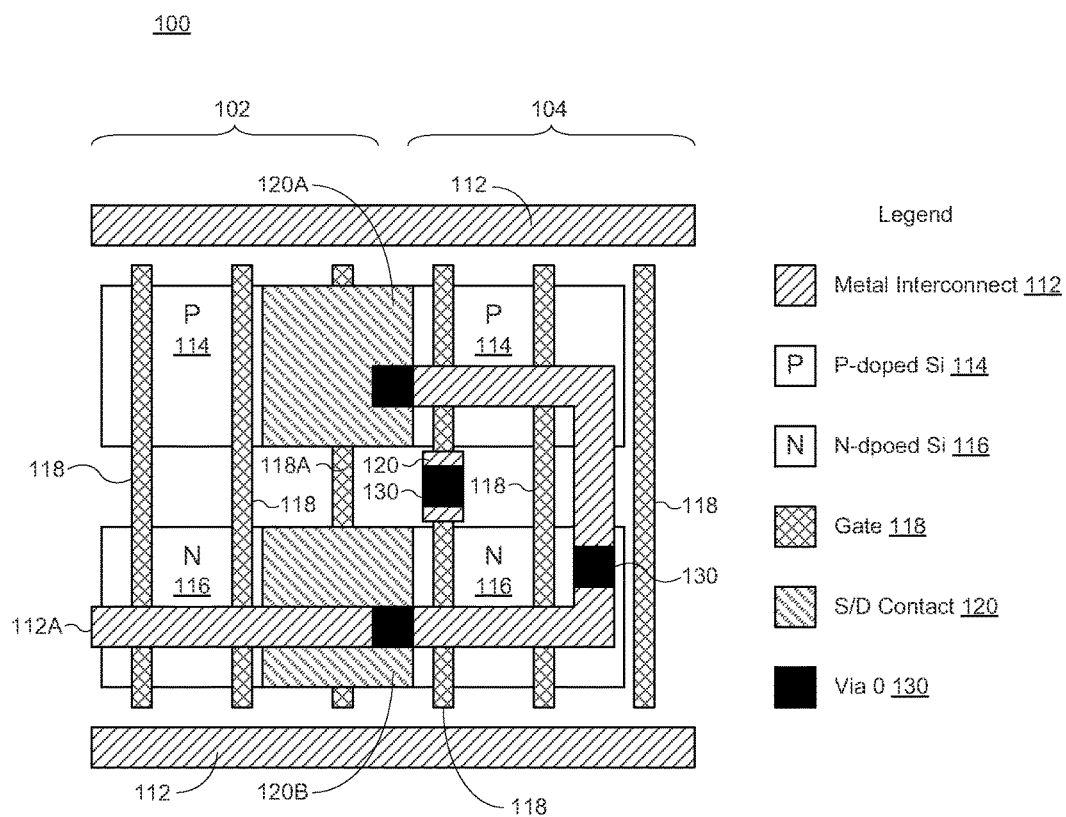

For example, as shown in reference to FIG. 4, S/D contacts 120A, 120B may be extended away from active transistor 104 and overlap (and short to) gate 118A to the proximate left of the active transistor 104. In this scenario, the left gate 118A may become a sacrificial gate (or removable gate) to allow an increase in contact area so as to reduce contact resistance of the S/D contacts 120A, 120B associated with the active transistor 104. This increase in cell area may improve device performance and may be considered somewhat analogous to double-folding transistors. It should be noted that as long as a gate is being sacrificed (or removed), the contact resistance may be further reduced by extending the S/D contacts 120A, 120B even further, e.g., as shown in FIG. 5.

In some cases, the sacrificial gate 118A may remain if considered necessary; however, the added S/D diffusion contact area of the S/D contacts 120A, 120B (even on the other side of the sacrificial gate) may conduct under the sacrificial gate 118A and may lower the overall contact resistance. The layout shown in FIG. 3 may then provide a lower overall contact resistance for a pitch of the sacrificed gate 118A. Further, in some implementations, the sacrificial gate 118A may be removed, as shown in FIG. 6.

Many process technologies may support removal of selected gates, either by not drawing the gate shape at all, or by covering the gate shape with a cut layer so as to identify to the foundry that the gate may be removed in processing. Further, the scenario in FIG. 6 may provide a lowest possible contact resistance for a given sacrificial gate pitch. With this implementation, it may be possible to extend one or more of the concepts as described in reference to FIGS. 4-6 to more than one sacrificial gate pitch. However, the benefits of additional sacrificial gates may have to be analyzed and compared to any drawback to increased cell area for a given technology. Other performance benefits may be realized in some cases of sacrificial gate removal. However, in some cases, the gates may restrict S/D strain effectiveness, which may be used to increase mobility. In some other cases, removing a neighboring gate may increase available S/D strain volume and may serve to increase mobility.

Figure 6:
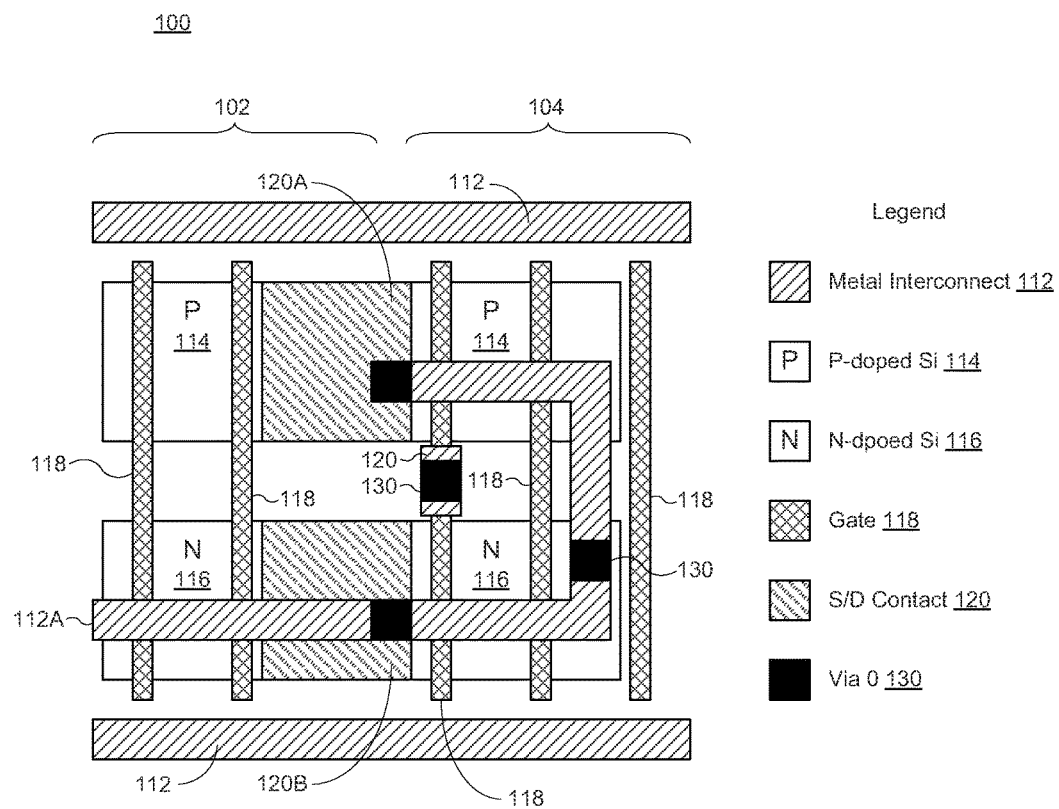

In reference to FIG. 6, the large contacts 120A, 120B are shown in a middle or near the middle of a S/D region; however, the large contacts 120A, 120B may be placed or positioned at an end of the S/D region. In some cases, this placement or positioning may be at a left or right boundary of a standard cell, or in other cases, this placement or positioning may be at an edge of internal diffusion breaks within a standard cell.

Figure 7:
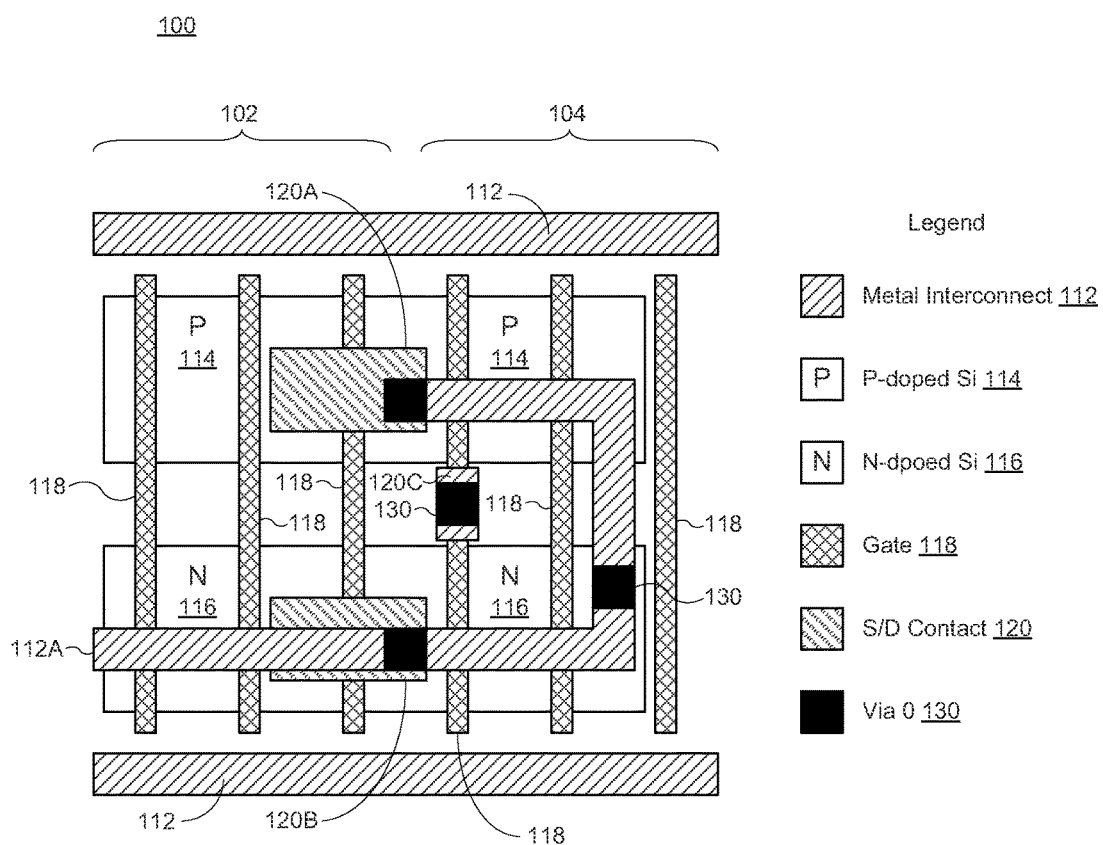

In some implementations, the S/D contacts 120A, 120B shown, e.g., in FIGS. 4-6 may be formed to span an entire transistor width to address the contact resistance problem. With support of various process technologies, it may be possible to examine tradeoffs between resistance (R) and capacitance (C). For instance, if the growth in contact width were supported, it may be possible that an optimum result may include a mixture of growing the S/D contacts 120A, 120B laterally and then shrinking them vertically, so as to arrive at a best performance, which is related to R*C. In this case, the S/D contacts 120A, 120B may be drawn as shown in FIG. 7.

In technologies below approximately 20 nm, where contact resistance problems are somewhat severe, contact layers may be typically printed with multiple patterning. Because multiple masks may be used to form contact shapes, this may facilitate the various methods and techniques described herein. That is, e.g., larger extended low resistance contacts may be printed with one or more masks and regular slim contacts (as shown in FIG. 7) may be printed using one or more separate mask(s). This may provide an advantage because attempting to print different sized contact holes on a same mask may be difficult. Further, in some cases, in reference to FIG. 7, e.g., the S/D contact 120C on the right may be decomposed to one contact mask, while the other two extended contacts 120A, 120B on the left may be decomposed to an additional mask.

Alternatively, a lithography solution may not support standard slot and wider contacts. In these cases, multiple slot contacts from multiple mask colors may be superimposed (overlapped with offset accounting for CD and overlay variation) so that a final wider contact is formed on a wafer.

Figure 8A:
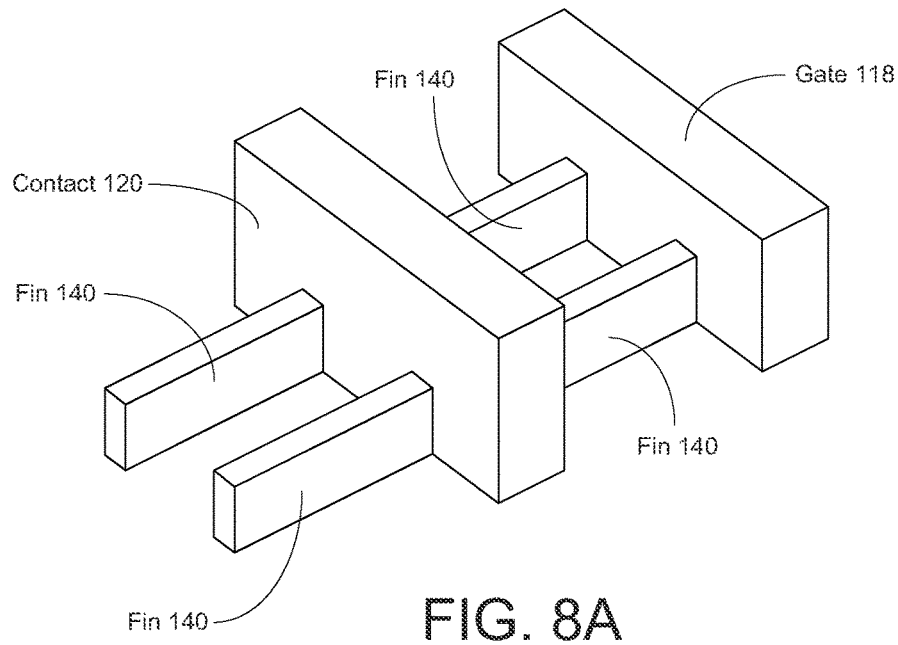
Figure 8B:
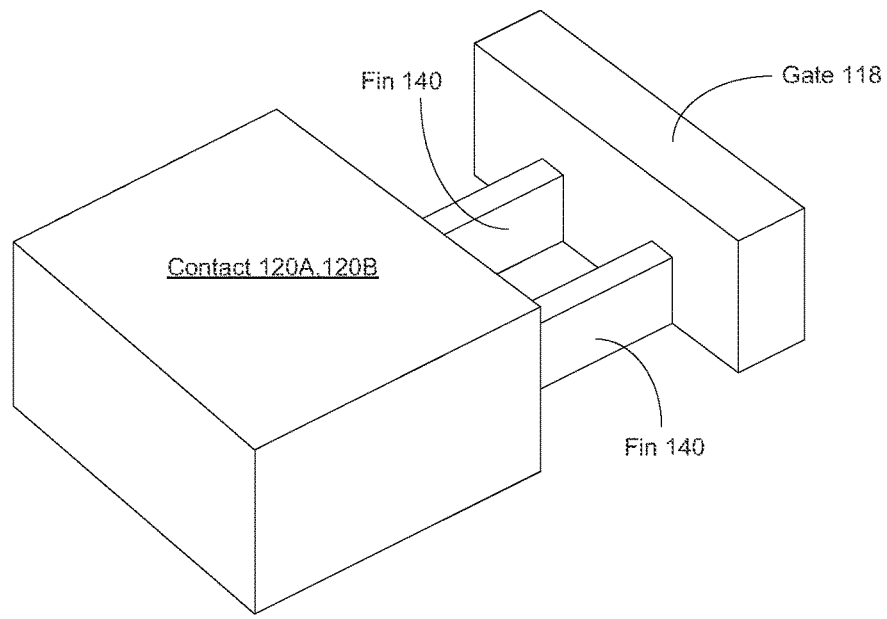

Further, an additional benefit may be realized for some gates in a given active region, e.g., in the case of fin-FET or nanowire FETs. In these 3D FETs, overlapping a contact shape with an end of the fin/nanowire may increase the contact area by including an end vertical face of the fin/nanowire. This is shown in FIGS. 8A and 8B. In reference to FIG. 8A, the standard contact 120 does not extend beyond an end of the fin 140, and in reference to FIG. 8B, the larger contact 120A, 120B overlaps the end of the fin 140, resulting in increased contact surface area.

In technologies below approximately 20 nm, the process may involve additional local interconnect or middle of line (MOL) process layers. One such layer is shown in FIGS. 2-7, labeled via 130, which may be referred to as via 0. The vias 130 may be used to connect the S/D contacts 120 to both the S/D diffusions 114, 116 and the gates 118, and this via 0 layer may be used to add additional conductance between the first metal layer (i.e., metal interconnects 112) and the transistors (i.e., cells 102, 104). The various techniques described herein may be applied to via 0 layer. For instance, in FIG. 9, standard square vias 0 130 are shown, a vertically extended via 0 130A is shown, and an enlarged square via 0 130B is shown. In some cases, reducing contact resistance may include increasing area of the vias (e.g., vias 0 130A, 130B of FIG. 9) for the selectively marked transistors by physically widening (e.g., extending or enlarging) the vias 0 for the selectively marked transistors. Further, in some other cases, multiple patterning may be used for via 0 layer so this variety of via 0 shapes may be supported given existing technology. While the enlarged via 0 shapes (i.e., 130A, 130B) may not technically add cell area per se (e.g., because they connect directly to the first metal interconnect layer 112), they may provide a boundary where first metal shapes may be placed, reducing pin sizes and routing options. Therefore, in some cases, enlarged via 0 shapes 130A, 130B may not increase implemented circuit block areas.

Figure 9:
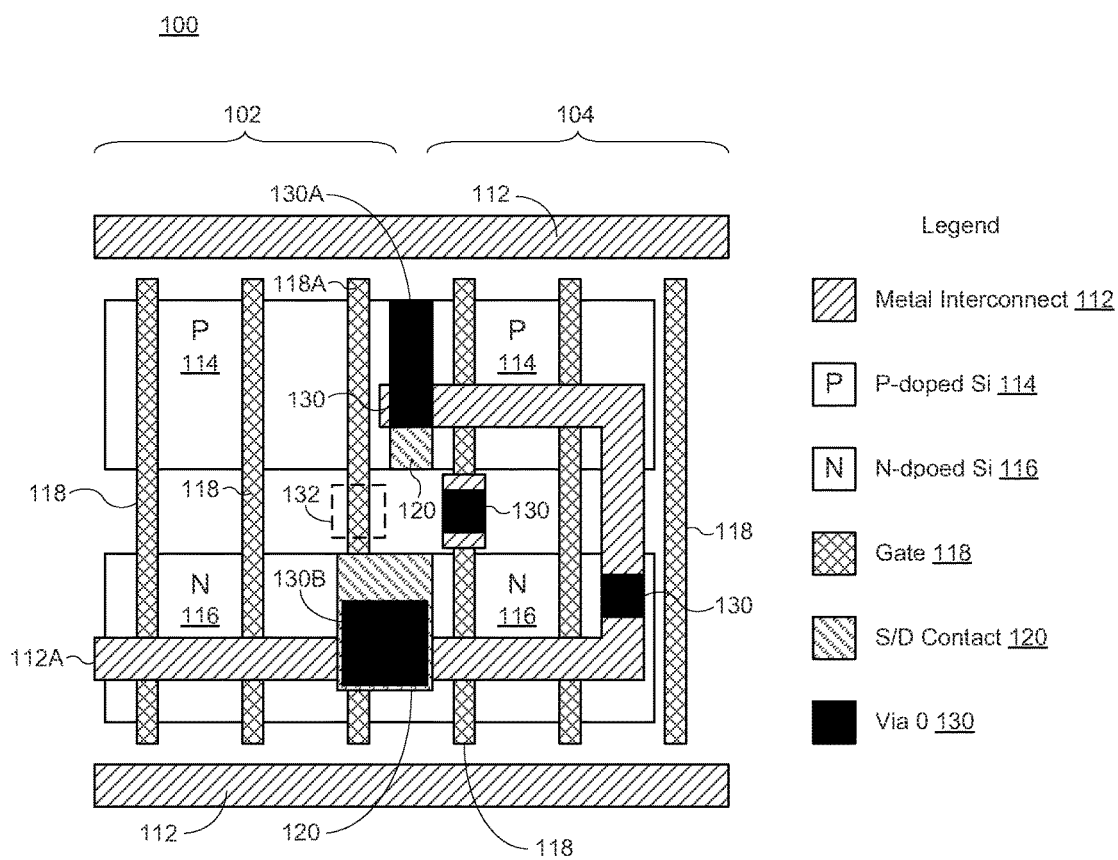

Further, regarding FIG. 9, dashed square 132 may represent a possible break of the gate shape of the gate 118A, either by not drawing a gate in this region or by adding a gate cut drawing layer when supported. This break 132 in the gate 118A may allow the use of a P-MOSFET on top in the case where the N-MOSFET on the bottom is sacrificed for contact resistance reduction. This asymmetric P/N drawing case with broken gate shape 132 may allow further reduction in overall circuit area.

In various implementations, physical design may refer to uses in input/output (I/O), standard cells, and/or memory instances. Physical design may also be bounded to particular process nodes. Modifications in layout design may be used in partnership with proposed process modifications to provide reduced contact resistance transistors (or higher performance transistors) in selected regions of an integrated circuit or chip. These modifications may be implemented using various techniques described in this disclosure. For instance, one technique described herein refers to drawing/marking cells for mitigating contact resistance in physical design by selectively modifying particular cells. Another technique described herein refers to selectively increasing the area of particular contacts for mitigating contact resistance in physical design.

Figure 10:
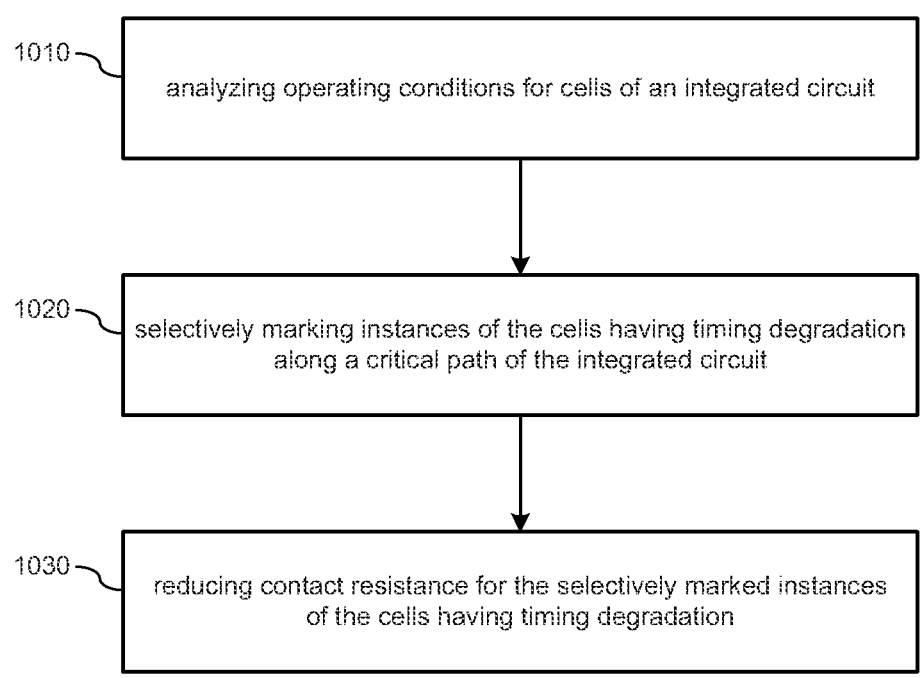
FIG. 10 illustrates a process flow of a method for mitigating contact resistance in physical design in accordance with various implementations described herein.

FIG. 10 illustrates a process flow of a method for mitigating contact resistance in physical design in accordance with various implementations described herein. It should be understood that even though method 1000 indicates a particular order of execution of operations, in some instances, certain portions of the operations may be executed in a different order, and on different systems. In other instances, additional operations or steps may be added to and/or omitted from method 1000. Further, computing device 1104 of FIG. 11 may be configured to perform method 1000. In some implementations, method 1000 may be implemented as a program or software instruction process configured to mitigate contact resistance in physical design to improve performance.

At block 1010, method 1000 may analyze operating conditions for cells of an integrated circuit. At block 1020, method 1000 may selectively mark instances of the cells having timing degradation along a critical path of the integrated circuit. At block 1030, method 1000 may reduce contact resistance for the selectively marked instances of the cells having timing degradation.

In some implementations, reducing contact resistance may include modifying contacts of the selectively marked transistors, including providing a higher drive current to the selectively marked transistors. In other implementations, reducing contact resistance may include modifying contacts of the selectively marked transistors, including providing different voltage threshold implants for the selectively marked transistors. In some other implementations, reducing contact resistance may include modifying contacts of the selectively marked transistors, including providing different lithographic bias on gate contact depositions for the selectively marked transistors.

In some implementations, reducing contact resistance may include modifying contacts of the selectively marked transistors, including providing different source/drain implants for the selectively marked transistors. In other implementations, reducing contact resistance may include modifying contacts of the selectively marked transistors, including providing different silicide depositions for the selectively marked transistors.

In some implementations, reducing contact resistance may include modifying contacts of the selectively marked transistors, including increasing area of the contacts for the selectively marked transistors. In some cases, increasing area of the contacts for the selectively marked transistors may include physically widening the contacts for the selectively marked transistors. In other cases, increasing area of the contacts for the selectively marked transistors may include reducing vertical length of the physically wider contacts for the selectively marked transistors. Further, in some implementations, reducing contact resistance may include modifying contacts of the selectively marked transistors, including increasing area of vias associated with the contacts for the selectively marked transistors.

Therefore, in reference to FIG. 10, method 1000 may increase the drive current of contacts for selectively marked instances of cells having timing degradation by reducing contact resistance of the contacts and/or vias. I.e., method 1000 may reduce contact resistance of contacts for the selectively marked instances of the cells showing timing degradation by increasing drive current for the contacts and/or vias.

Figure 11:
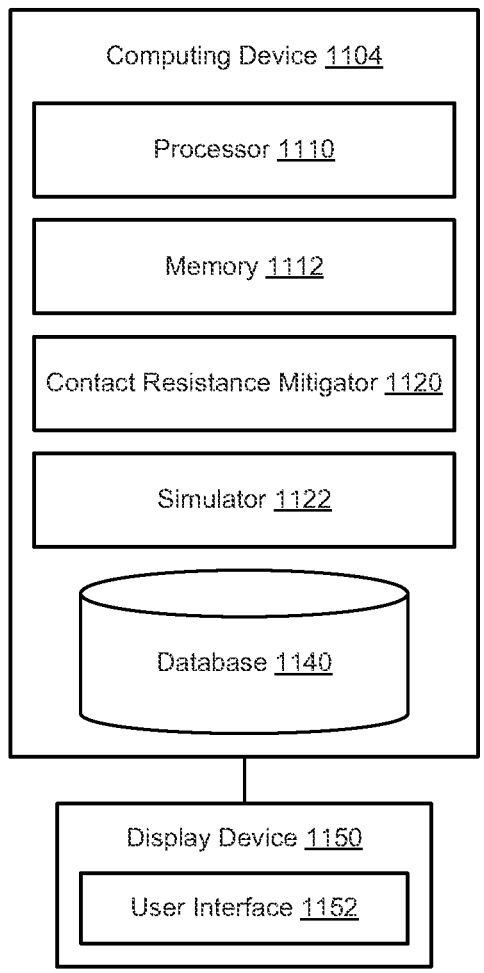
FIG. 11 illustrates a diagram of a system for mitigating contact resistance in physical design in accordance with various implementations described herein.

FIG. 11 illustrates a block diagram of a system 1100 for mitigating contact resistance in physical design in accordance with various implementations described herein. Further, the system 1100 may also be configured for selectively marking instances of cells for contact resistance mitigation in physical design in accordance with various implementations described herein.

In reference to FIG. 11, the system 1100 may include a computer based system configured to mitigate contact resistance in physical design. The system 1100 may be associated with at least one computing device 1104 that is implemented as a special purpose machine configured to mitigate contact resistance in physical design, as described herein. In some implementations, the computing device 1104 may include any standard element(s) and/or component(s), including at least one processor(s) 1110, memory 1112 (e.g., non-transitory computer-readable storage medium), one or more database(s) 1140, power, peripherals, and various other computing elements and/or components that may not be specifically shown in FIG. 11. The computing device 1104 may include instructions stored on the non-transitory computer-readable medium 1112 that are executable by the at least one processor 1110. The computing device 1104 may be associated with a display device 1150 (e.g., a monitor or other display) that may be used to provide a user interface (UI) 1152, such as, e.g., a graphical user interface (GUI). In some instances, the UI 1152 may be used to receive various parameters and/or preferences from a user for managing, operating, and/or utilizing the computing device 1104. As such, the computing device 1104 may include the display device 1150 for providing output to a user, and the display device 1150 may include the UI 1152 for receiving input from the user.

In various implementations, the computing device 1104 may be configured to implement various methodologies for mitigating contact resistance in physical design. For instance, the computing device 1104 may analyze operating conditions for cells of an integrated circuit. The computing device 1104 may selectively mark instances of the cells having timing degradation along a critical path of the integrated circuit. The computing device 1104 may reduce contact resistance for the selectively marked instances of the cells having timing degradation.

In reference to FIG. 11, the computing device 1104 may include a contact resistance mitigator module 1120 configured to cause the at least one processor 1110 to implement one or more or all techniques described in reference to FIGS. 1-7, including techniques related to selectively marking cells for contact resistance mitigation in physical design of FIG. 1. The contact resistance mitigator module 1120 may be implemented in hardware or software. If implemented in software, the contact resistance mitigator module 1120 may be stored in memory 1112 or database 1140. If implemented in hardware, the contact resistance mitigator module 1120 may be a separate processing component configured to interface with the processor 1110.

In various implementations, the contact resistance mitigator module 1120 may be configured to cause the at least one processor 1110 to perform various techniques, as described herein in reference to FIGS. 1-7. For instance, contact resistance mitigator module 1120 may be configured to cause the at least one processor 1110 to analyze operating conditions for cells of an integrated circuit. The contact resistance mitigator module 1120 may be configured to cause the at least one processor 1110 to selectively mark instances of the cells having timing degradation along a critical path of the integrated circuit. Further, the contact resistance mitigator module 1120 may be configured to cause the at least one processor 1110 to reduce contact resistance for the selectively marked instances of the cells having timing degradation.

In some implementations, the contact resistance mitigator module 1120 may be configured to cause the at least one processor 1110 to provide a higher drive current to the selectively marked transistors, provide different voltage threshold implants for the selectively marked transistors, and/or provide different lithographic bias on gate contact depositions for the selectively marked transistors.

In some implementations, the contact resistance mitigator module 1120 may be configured to cause the at least one processor 1110 to provide different source/drain implants for the selectively marked transistors and/or provide different silicide depositions for the selectively marked transistors.

In some implementations, the contact resistance mitigator module 1120 may be configured to cause the at least one processor 1110 to increase area of the contacts for the selectively marked transistors. In some cases, increasing area of the contacts for the selectively marked transistors may include physically widening the contacts for the selectively marked transistors. In some other cases, increasing area of the contacts for the selectively marked transistors may include reducing vertical length of the physically wider contacts for the selectively marked transistors.

In some implementations, the contact resistance mitigator module 1120 may be configured to cause the at least one processor 1110 to increase area of vias associated with the contacts for the selectively marked transistors.

Therefore, as described herein, the drive current of contacts for the selectively marked instances of the cells having timing degradation may be increased by reducing contact resistance of the contacts. I.e., the contact resistance of contacts for the selectively marked instances of the cells showing timing degradation may be reduced by increasing drive current for the contacts.

Further, in reference to FIG. 11, the computing device 1104 may include a simulator module 1122 configured to cause the at least one processor 1110 to generate one or more simulations of the integrated circuit. The simulator module 1122 may be referred to as a simulating component and may be implemented in hardware or software. If implemented in software, the simulator module 1122 may be stored in memory 1112 or database 1140. If implemented in hardware, the simulator module 1122 may be a separate processing component configured to interface with the processor 1110. In some instances, the simulator module 1122 may include a SPICE simulator configured to generate SPICE simulations of the integrated circuit. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Thus, in some instances, the contact resistance mitigator module 1120 may be configured to interface with the simulator module 1122 to generate timing data based on one or more simulations (including, e.g., SPICE simulations) of an integrated circuit that may be used for analyzing the timing data of the integrated circuit to identify instances of timing degradation. Further, the contact resistance mitigator module 1120 may be configured to use the one or more simulations (including, e.g., SPICE simulations) of an integrated circuit for recommending changes for instances of the cells along the paths having timing degradation, as described herein.

In some implementations, the computing device 1104 may include one or more databases 1140 configured to store and/or record various information related to mitigating contact resistance in physical design. In various instances, the database(s) 1140 may be configured to store and/or record information related to the integrated circuit, operating conditions, and/or timing data. Further, the database(s) 1140 may be configured to store and/or record information related to the integrated circuit and timing data in reference to simulation data (including, e.g., SPICE simulation data).

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

Described herein are various implementations of methods for mitigating contact resistance. In one implementation, a method may include analyzing operating conditions for cells of an integrated circuit. The method may include selectively marking instances of the cells having timing degradation along a critical path of the integrated circuit. The method may include reducing contact resistance for the selectively marked instances of the cells having timing degradation.

Described herein are various implementations of a non-transitory computer-readable medium having stored thereon a plurality of computer-executable instructions which, when executed by a computer, cause the computer to analyze timing data associated with cells of an integrated circuit, selectively mark instances transistors of the cells having timing degradation along one or more paths of the integrated circuit, and increase drive current of contacts for the selectively marked instances transistors of the cells having timing degradation by reducing contact resistance of the contacts.

Described herein are various implementations of a system for mitigating contact resistance. The system may include a processor and memory having stored thereon instructions that, when executed by the processor, cause the processor to analyze timing data associated with operating conditions of cells along one or more paths of an integrated circuit, selectively mark instances of the cells showing timing degradation, and reduce contact resistance of contacts for the selectively marked instances of the cells showing timing degradation by increasing drive current for the contacts.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
analyzing operating conditions for cells of an integrated circuit;
selectively marking instances of the cells having timing degradation along a critical path of the integrated circuit;
reducing contact resistance for the selectively marked instances of the cells having timing degradation, wherein the selectively marked instances of the cells comprise selectively marked transistors, and wherein reducing the contact resistance comprises modifying contacts of the selectively marked transistors by increasing an area of the contacts for the selectively marked transistors, including increasing an area of the contact of a selectively marked transistor to overlap a gate proximate to the selectively marked transistor; and
fabricating a mask based upon the instances of the cells of the integrated circuit.

2. The method of claim 1, wherein reducing the contact resistance comprises modifying contacts of the selectively marked transistors by providing a higher drive current to the selectively marked transistors.

3. The method of claim 1, wherein reducing the contact resistance comprises modifying contacts of the selectively marked transistors by modifying implants for the contacts of the selectively marked transistors.

4. The method of claim 1, wherein reducing the contact resistance comprises modifying contacts of the selectively marked transistors by providing different lithographic bias on gate contact depositions for the selectively marked transistors.

5. The method of claim 1, wherein reducing the contact resistance comprises modifying contacts of the selectively marked transistors by providing different source/drain implants for the selectively marked transistors.

6. The method of claim 1, wherein reducing the contact resistance comprises modifying contacts of the selectively marked transistors by providing different silicide depositions for the selectively marked transistors.

7. The method of claim 1, wherein reducing the contact resistance further comprises modifying contacts of the selectively marked transistors by removing at least one gate that is adjacent to at least one of the selectively marked transistors.

8. The method of claim 1, wherein reducing the contact resistance comprises increasing area of the contacts for the selectively marked transistors by physically widening the contacts for the selectively marked transistors.

9. The method of claim 8, wherein increasing the area of the contacts for the selectively marked transistors comprises reducing a vertical length of the physically wider contacts for the selectively marked transistors.

10. The method of claim 1, wherein reducing the contact resistance comprises increasing area of the vias for the selectively marked transistors by physically widening the vias for the selectively marked transistors.

11. A non-transitory computer-readable medium having stored thereon a plurality of computer-executable instructions which, when executed by a computer, cause the computer to:
analyze timing data associated with cells of an integrated circuit;
selectively mark transistors of the cells having timing degradation along one or more paths of the integrated circuit; and
increase drive current of contacts for the selectively marked transistors of the cells having timing degradation by reducing contact resistance of the contacts, wherein reducing the contact resistance of the contacts comprises increasing an area of the contacts for the selectively marked transistors, including increasing an area of the contact of a selectively marked transistor to overlap a gate proximate to the selectively marked transistor.

12. The computer-readable medium of claim 11, wherein reducing the contact resistance comprises modifying contacts of the selectively marked transistors by providing different voltage threshold implants for the selectively marked transistors.

13. The computer-readable medium of claim 11, wherein reducing the contact resistance comprises modifying contacts of the selectively marked transistors by providing different lithographic bias on gate contact depositions for the selectively marked transistors.

14. The computer-readable medium of claim 11, wherein reducing the contact resistance comprises modifying contacts of the selectively marked transistors by providing different source/drain implants for the selectively marked transistors.

15. The computer-readable medium of claim 11, wherein reducing the contact resistance comprises modifying contacts of the selectively marked transistors by providing different silicide depositions for the selectively marked transistors.

16. The computer-readable medium of claim 11, wherein increasing the area of the contacts for the selectively marked transistors comprises physically widening the contacts for the selectively marked transistors.

17. The computer-readable medium of claim 16, wherein increasing the area of the contacts for the selectively marked transistors comprises reducing the vertical length of the physically wider contacts for the selectively marked transistors.

18. The computer-readable medium of claim 11, wherein reducing the contact resistance comprises modifying contacts of the selectively marked transistors by increasing area of vias associated with the contacts for the selectively marked transistors.

19. A system, comprising:
a processor; and
memory having stored thereon instructions that, when executed by the processor, cause the processor to:
analyze timing data associated with operating conditions of cells along one or more paths of an integrated circuit;
selectively mark instances of the cells showing timing degradation; and reduce contact resistance of contacts for the selectively marked instances of the cells showing timing degradation by increasing an area of the contacts for the selectively marked instances of the cells, including increasing an area of the contact of a selectively marked instance of the cells to overlap a gate instance proximate to the selectively marked instance of the cells.

* * * * *